(12) United States Patent
Jacques et al.

(10) Patent No.: US 8,794,200 B2
(45) Date of Patent: Aug. 5, 2014

(54) ENGINE ASSEMBLY WITH PHASING MECHANISM ON ECCENTRIC SHAFT FOR VARIABLE CYCLE ENGINE

(71) Applicant: GM Global Technology Operations LLC, Detroit, MI (US)

(72) Inventors: Robert Lionel Jacques, Troy, MI (US); Jeff Jocsak, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 66 days.

(21) Appl. No.: 13/683,100

(22) Filed: Nov. 21, 2012

(65) Prior Publication Data

US 2014/0137824 A1 May 22, 2014

(51) Int. Cl.
*F02B 75/04* (2006.01)
(52) U.S. Cl.
CPC ............. *F02B 75/048* (2013.01); *F02B 75/045* (2013.01)
USPC ...................................... 123/78 F; 123/48 B
(58) Field of Classification Search
CPC ...... F02B 75/045; F02B 75/048; F02D 15/00; F02D 35/00; F02D 39/02
USPC .. 123/197.4, 48 R, 48 B, 48 A, 78 R, 78 AA, 123/78 E, 78 F
See application file for complete search history.

(56) References Cited

U.S. PATENT DOCUMENTS

| | | | | |
|---|---|---|---|---|
| 4,174,683 A | * | 11/1979 | Vivian | 123/48 C |
| 8,413,617 B2 | * | 4/2013 | Simpson et al. | 123/46 E |
| 8,662,029 B2 | * | 3/2014 | Simpson et al. | 123/46 E |

OTHER PUBLICATIONS

Chongming Wang, Ritchie Daniel, Hongming Xu; "Research of the Atkinson Cycle in the Spark Ignition Engine"; SAE International; 2012-01-0390; published Apr. 16, 2012.
Sei Watanabe, Hibiki Koga, Shohei Kono; "Research on Extended Expansion General-Purpose Engine"; SAE International; 2006-32-0101; Small Engine Technology Conference and Exhibition Nov. 13-16, 2006.
Ryosuke Hiyoshi, Shunichi Aoyama, Shinichi Takemura, Kenshi Ushijima, Takanobu Sugiyama; "A Study of a Multiple-Link Variable Compression Ratio System for Improving Engine Performance"; SAE International; 2006-01-0616; 2006 World Congress Apr. 3-6, 2006.

* cited by examiner

*Primary Examiner* — Noah Kamen
*Assistant Examiner* — Grant Moubry
(74) *Attorney, Agent, or Firm* — Quinn Law Group, PLLC

(57) ABSTRACT

An engine assembly includes a crankshaft having a first axis of rotation and a crankpin offset from the first axis of rotation. A second shaft is offset from the crankshaft and has a second axis of rotation. A piston is movable in a cylinder between a top dead center position and a bottom dead center position to drive the crankshaft. A connecting rod extends from the piston. A four-jointed linkage assembly pivotably connects the connecting rod, crankshaft, and second shaft. A drive system operatively connects the crankshaft and the second shaft to drive the second shaft via the crankshaft. A phasing mechanism connects the drive system and the second shaft and is controllable to vary the rotational position of the second shaft relative to the crankshaft.

19 Claims, 7 Drawing Sheets

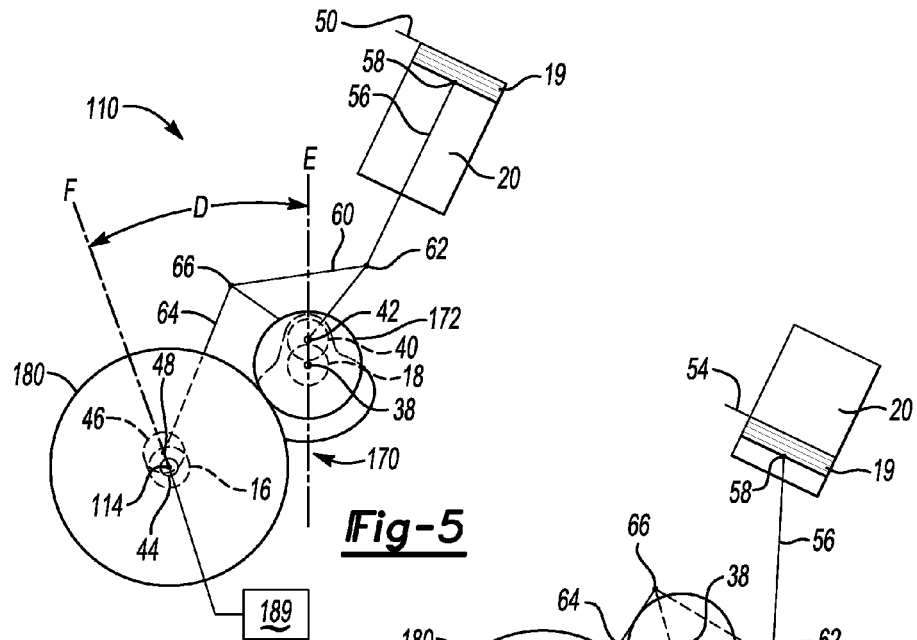
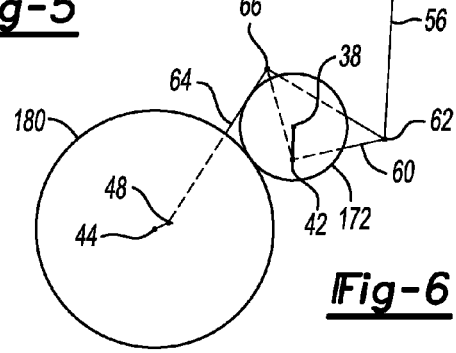
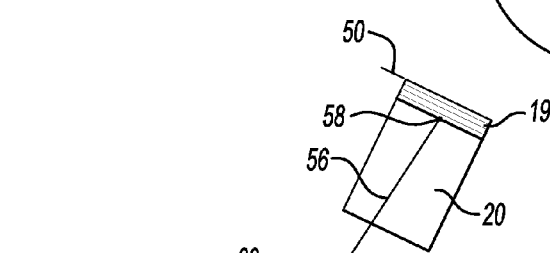
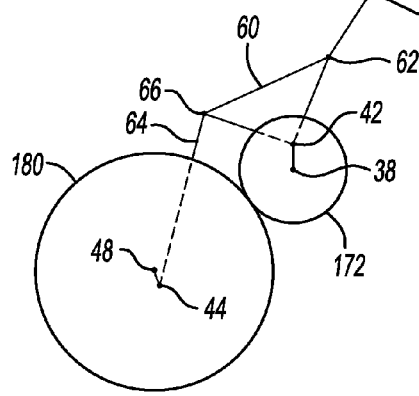
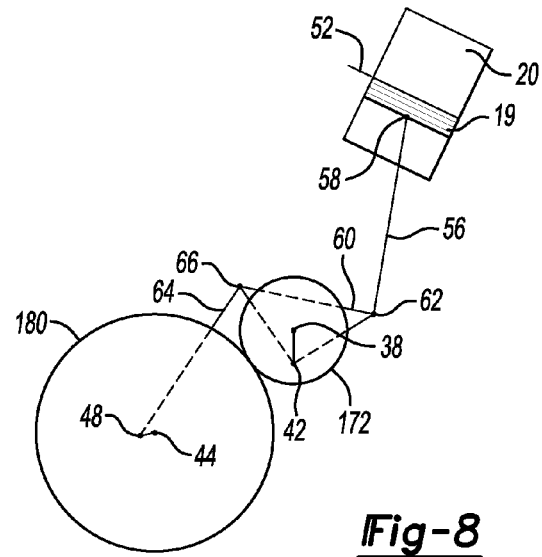
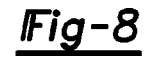

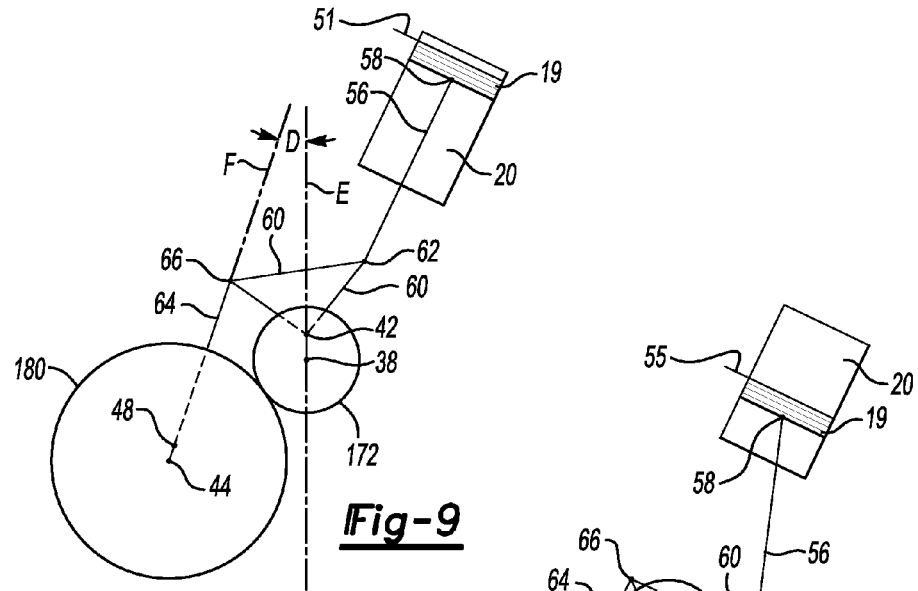
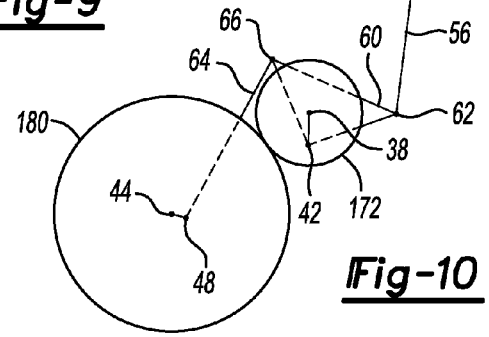
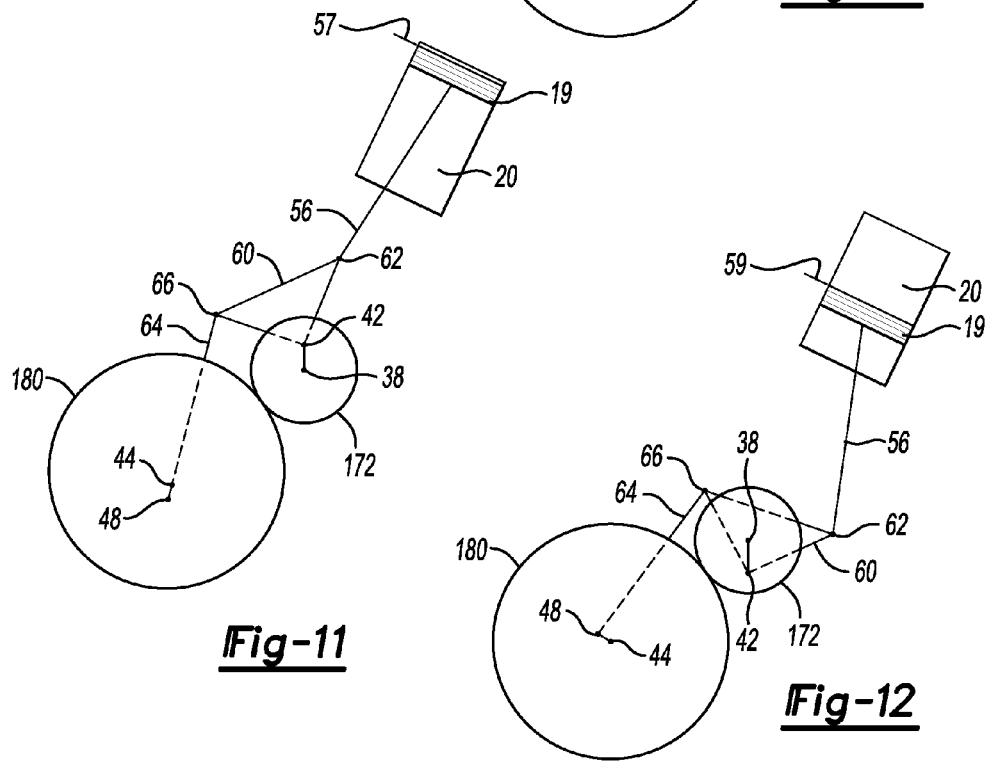

ENGINE ASSEMBLY WITH PHASING MECHANISM ON ECCENTRIC SHAFT FOR VARIABLE CYCLE ENGINE

TECHNICAL FIELD

The present teachings generally include an engine assembly with a multi-linkage system and offset shaft affecting a four-stroke cycle of a piston.

BACKGROUND

Vehicle designers strive to power vehicles with highly fuel efficient engines or other power sources. Multiple linkage systems connecting a crankshaft, an eccentric shaft and a piston are configured to move the piston within a cylinder according to a selected four-stroke working cycle, such as an Atkinson cycle. While suitable for their intended purposes, these multiple linkage systems constrain movement of the piston to only one four-stroke working cycle.

As used herein, an Atkinson cycle is a four-stroke cycle with an intake stroke, a compression stroke, an expansion stroke, and an exhaust stroke, with the expansion stroke longer than the compression stroke (i.e., an expansion volume greater than a compression volume). The expansion ratio of a four-stroke working cycle is the ratio of the volume of the expansion stroke to the volume of the compression stroke. For cylindrical working chambers, this is the same as the ratio of the length of the expansion stroke to the length of the compression stroke. An Atkinson cycle has an expansion ratio greater than 1.

A true Atkinson cycle engine reduces pumping compared to a "pseudo Atkinson cycle" engine, which is a conventional Otto cycle engine with an expansion ratio of one and late intake valve closing. A true Atkinson cycle reduces the pumping losses associated with pulling air/fuel mixture into the cylinder and then pumping it back out during the compression stroke, which is inherent in a pseudo Atkinson cycle engine with late intake valve closing. References herein to an Atkinson cycle engine means a true Atkinson cycle, not a pseudo-Atkinson cycle engine. Atkinson cycle engines typically have lower power than Otto cycle engines, so a larger displacement engine is required to provide the same level of power for wide open throttle performance.

SUMMARY

An engine assembly is provided that uses a multiple linkage system and a phased eccentric shaft to cause movement of a piston according to a four-stroke working cycle, but enables the working cycle to be varied to meet changing output demands. Furthermore, the engine assembly is configured such that the top dead center position of the piston lowers less than 1 millimeter as the mechanism is phased from Atkinson cycle operation to Otto cycle operation to offset the effect on geometric compression ratio of the increasing compression stroke length. As a result, geometric compression ratio is maintained relatively constant as the mechanism is phased. For example, in one embodiment, the geometric compression ratio (CR) can be within ±0.3 CR of the nominal CR defined in full-Atkinson operation.

The engine assembly includes an engine block defining a cylinder. The engine assembly also includes a crankshaft having a first axis of rotation and a crankpin offset from the first axis of rotation. A second shaft is offset from the crankshaft and has a second axis of rotation and an eccentric portion offset from the second axis of rotation. A piston is operatively connected to the crankshaft and is movable in the cylinder between a top dead center position and a bottom dead center position to drive the crankshaft. A connecting rod extends from the piston. A four jointed linkage assembly pivotably connects the connecting rod, the crankshaft, and the second shaft. The piston is pivotably connected to the connecting rod to pivot at a pivot axis, and the cylinder is configured so that the pivot axis is aligned with the first axis of rotation along a center axis of the cylinder. A drive system operatively connects the crankshaft and the second shaft to drive the second shaft via the crankshaft. A phasing mechanism operatively connects to the second shaft, and is controllable to vary the rotational position of the second shaft relative to the crankshaft to thereby vary the operation of the piston within the cylinder between an Otto cycle and an Atkinson cycle.

A four-stroke cycle of the piston can be varied by the phasing mechanism to adapt to changes in power demanded, thereby balancing required output power with efficiency considerations. For example, the efficiency benefits of an Atkinson cycle engine can be attained, while enabling the same engine to run as an Otto cycle engine when required for wide open throttle performance. As used herein, an "Atkinson cycle" is a four-stroke working cycle having an expansion stroke that is longer than a compression stroke, resulting in an expansion ratio greater than one. As used herein, an "Otto" cycle is a four-stroke working cycle having a substantially equal expansion stroke and compression stroke (i.e., an expansion stroke of substantially the same volume as the compression stroke, resulting in an expansion ratio of one).

By aligning the pivot axis of the piston with the axis of rotation of the crankshaft along the center axis of the cylinder, in addition to adding a phasing mechanism, variation in top dead center position is minimized while, in one embodiment, the expansion to compression ratio can be varied from approximately 1.4:1 to 1:1. Without this alignment, excessive variation could occur both at the top dead center position and the bottom dead center position of the piston in the various strokes, causing large changes in geometric compression ratio and trapped residual gases from the previous cycle, potentially causing engine knocking, engine misfire, and low volumetric efficiency and power.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 5 is a schematic illustration of another embodiment of an engine assembly at the end of an exhaust stroke of an Atkinson four-stroke working cycle.

FIG. 6 is a schematic illustration of the engine assembly of FIG. 5 at the end of an expansion stroke of the Atkinson four-stroke working cycle.

FIG. 7 is a schematic illustration of the engine assembly of FIG. 5 at the end of a compression stroke of the Atkinson four-stroke working cycle.

FIG. 8 is a schematic illustration of the engine assembly of FIG. 5 at the end of an intake stroke of the Atkinson four-stroke working cycle.

FIG. 9 is a schematic illustration of the engine assembly of FIGS. 5-8 at the end of an exhaust stroke of an Otto four-stroke working cycle.

FIG. 10 is a schematic illustration of the engine assembly of FIG. 9 at the end of an expansion stroke of the Otto four-stroke working cycle.

FIG. 11 is a schematic illustration of the engine assembly of FIG. 9 at the end of a compression stroke of the Otto four-stroke working cycle.

FIG. 12 is a schematic illustration of the engine assembly of FIG. 9 at the end of an intake stroke of the Otto four-stroke working cycle.

DETAILED DESCRIPTION

Figures 1, 2:
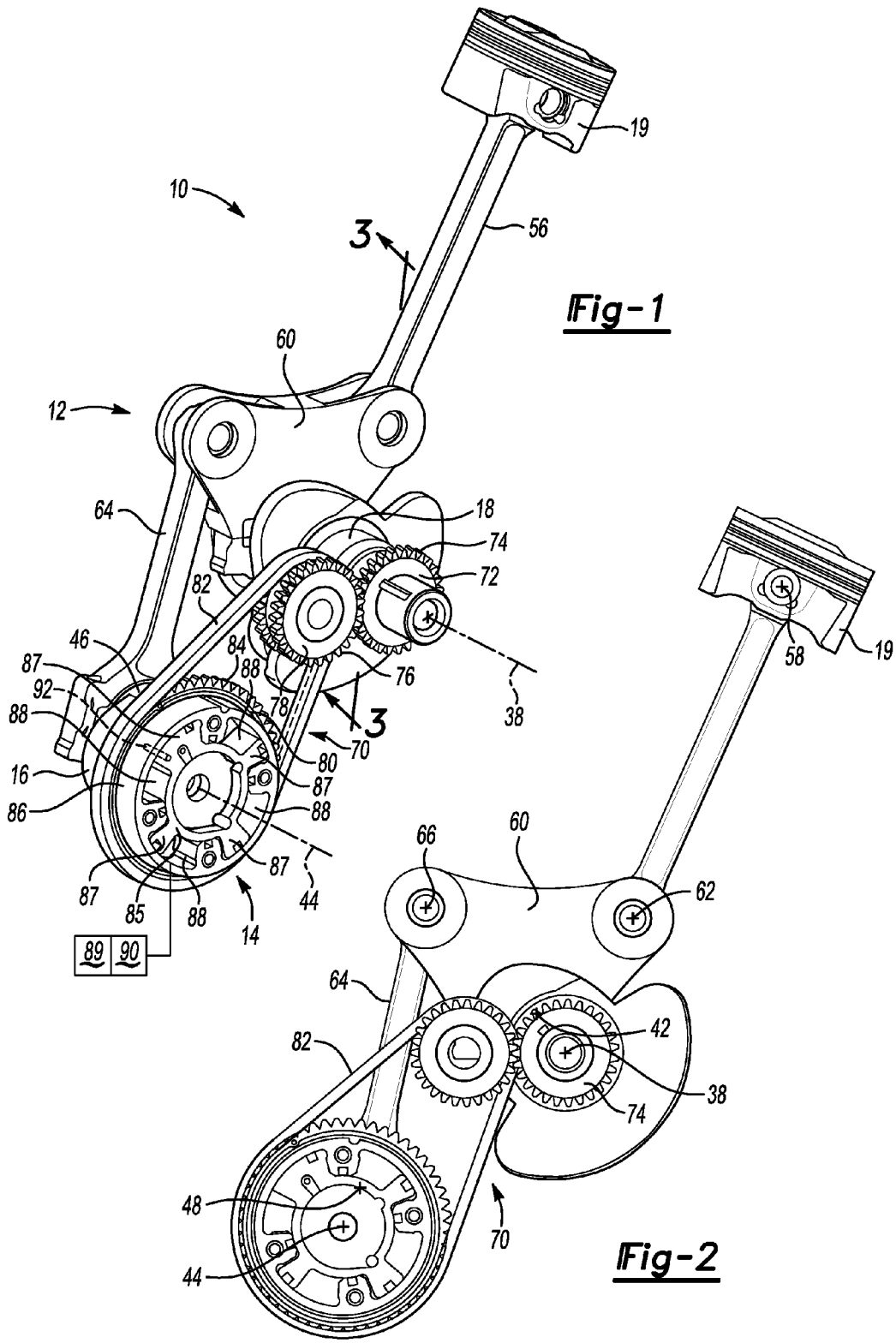
FIG. 1 is a schematic perspective illustration of a portion of an engine assembly showing a piston, a crankshaft, and an eccentric shaft operatively connected by a multi jointed linkage.
FIG. 2 is a schematic illustration in side view of the portion of the engine assembly of FIG. 1.
Figure 3:
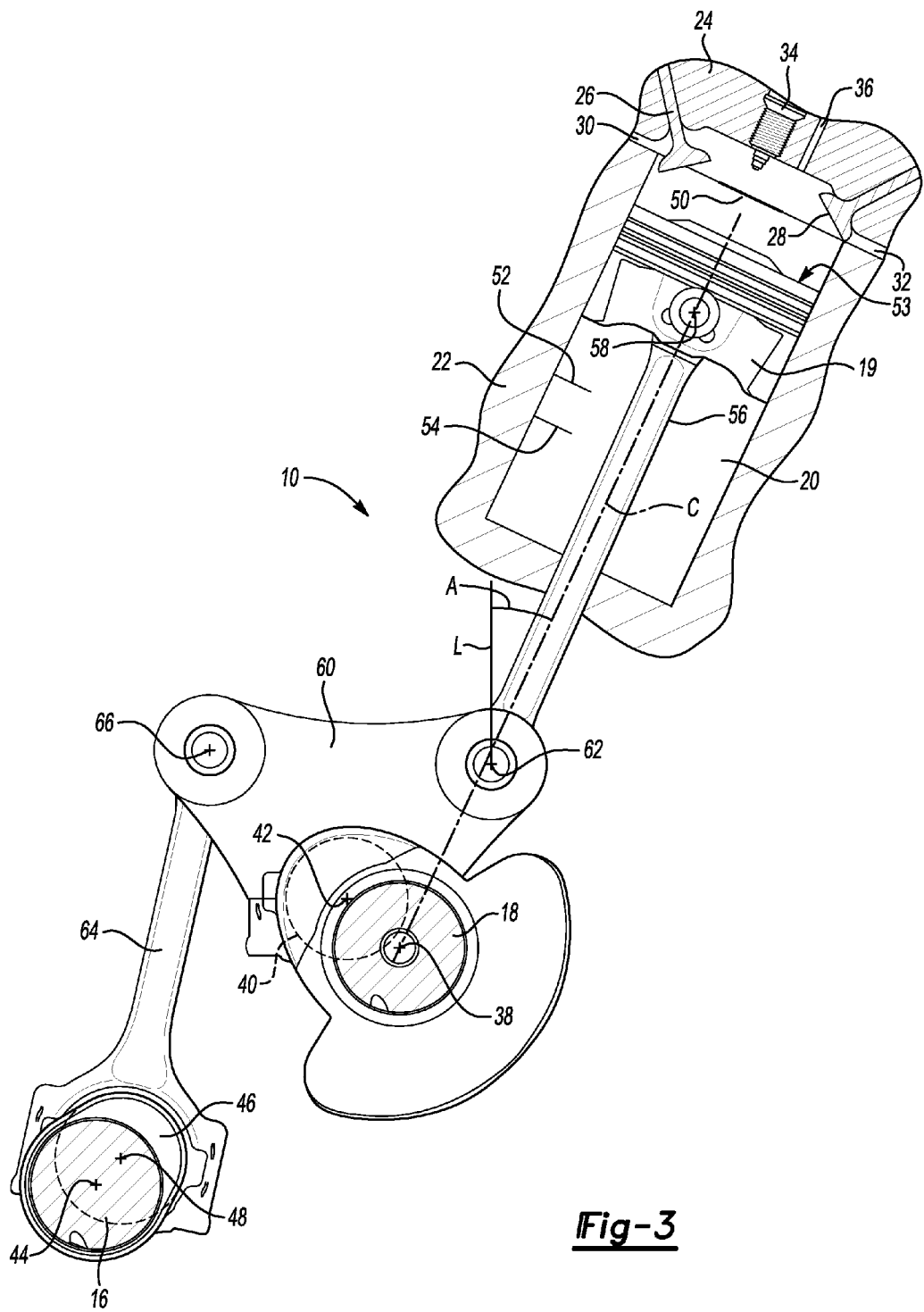
FIG. 3 is a schematic illustration in partial fragmentary cross-sectional view of the portion of the engine assembly of FIG. 1, taken at lines 3-3 in FIG. 1, showing an engine block forming a cylinder in which the piston moves.

Referring to the drawings, wherein like reference numbers are used to identify like or identical components in the various views, FIGS. 1-3 shows a portion of a first embodiment of an engine assembly 10 that includes a four jointed linkage assembly 12 with a phasing mechanism 14 that permits phasing of a second shaft 16 relative to a crankshaft 18 to vary operation of a piston 19 between two different four-stroke working cycles, such as but not limited to an Atkinson four-stroke working cycle and an Otto four-stroke working cycle. Moreover, the engine assembly 10 is configured so that the majority of the difference between the two cycles in the stroke of the piston 19 is of the bottom dead center position of the piston 19 within the cylinder 20, with the top dead center position of the piston 19 also lowered by less than one millimeter at the end of the compression stroke in the Otto cycle relative to the Atkinson cycle.

FIG. 3 shows the piston 19 within a cylinder 20 defined in an engine block 22, such as by casting or boring. A cylinder head 24 mounts to the engine block 22 and supports at least one intake valve 26 and at least one exhaust valve 28 above the cylinder 20. The valves 26, 28 are controlled by any known manner, such as by a camshaft, hydraulics or otherwise to lift and lower to allow air to enter through an intake passage 30 and exit through an exhaust passage 32 during a four-stroke working cycle of the piston 19. The cylinder head 24 also supports a spark plug 34 and a fuel injector 36 to enable combustion within the cylinder 24, as described herein. Although only one piston 19 and one cylinder 20 are shown, the engine block 22 defines a plurality of cylinders 20, each of which contains a piston like piston 19 that is operatively connected to the crankshaft 18 and the eccentric shaft 16 by a linkage assembly 12 like that shown. A similar engine block 22 having multiple cylinders 20 is shown as part of a hybrid powertrain 300 in FIG. 13.

As best shown in FIG. 3, the crankshaft 18 has a first axis of rotation 38. The crankshaft 18 is an eccentric shaft as it includes a crankpin 40 with a crankpin axis 42 that is offset from and parallel to the first axis of rotation 38. Like the crankshaft 18, the second shaft 16 is also an eccentric shaft. The second shaft 16 has a second axis of rotation 44 and has an eccentric portion 46 with an eccentric portion axis 48 that is offset from and parallel to the second axis of rotation 44.

The piston 19 is operatively connected to the crankshaft 18 and is movable linearly in the cylinder 20 according to a desired four-stroke cycle that has an intake stroke, a compression stroke, an expansion stroke, and an exhaust stroke to drive the crankshaft 18. In a first four-stroke cycle shown in FIGS. 5-8, an upper surface 53 of the piston 19 moves from top dead center position 50 to bottom dead center position 52 on an intake stroke (piston 19 movement from FIG. 5 to FIG. 8), and from bottom dead center position 52 to top dead center position 50 on a compression stroke (piston 19 movement from FIG. 8 to FIG. 7). The piston 19 moves from top dead center position 50 and bottom dead center position 54 in an expansion stroke (piston movement from FIG. 7 to FIG. 6), and from bottom dead center position 54 to top dead center position 50 in an exhaust stroke (piston movement from FIG. 6 to FIG. 5). Bottom dead center position 54 is lower than bottom dead center position 52. Accordingly, the length of the expansion stroke (from top dead center position 50 to bottom dead center position 54) is longer than the length of the compression stroke (from position 52 to position 50). The four-stroke working cycle of FIGS. 5-8 thus has an expansion ratio greater than 1, and is a true Atkinson cycle.

As discussed herein, by operation of the phasing mechanism 14 and due to the relative orientation of the cylinder 20 and the crankshaft 18, the bottom dead center position on an intake stroke can be varied to a lower bottom dead center position 59 during an Otto cycle (illustrated in FIGS. 9-12), providing an expansion ratio of one. The top dead center position 57 of the compression stroke is also lowered slightly, by approximately 0.8 mm, to the position 57 of FIG. 11. As discussed further herein, this ensures the geometric compression ratio (CR) of the Otto cycle varies only slightly from that of the Atkinson cycle. The length of the expansion stroke (from the top dead center position 57 to the bottom dead center position 55) is equal to the length of the compression stroke (from the bottom dead center position 59 to the top dead center position 57), providing an expansion ratio of one. That is, the bottom dead center position 59 is the same as the bottom dead center position 55. Optionally, other bottom dead center positions between the positions 52, 54 and top dead center positions lower than 50 can also be achieved by control of the phasing mechanism 14.

A connecting rod 56 is pivotably connected to and extends from the piston 19 at a pivot axis 58, referred to herein as a fourth pivot axis. The connecting rod 56 is pivotably connected at an opposite end to a first linkage member 60 at a pivot axis 62, referred to herein as a first pivot axis. The crankshaft 18 and the crankpin 40 are rotatable relative to the first linkage member 60 about the first axis of rotation 38 so that the crankpin axis 42 serves as a pivot axis of the first linkage member 60.

A second linkage member 64, also referred to as a swing rod, is pivotably connected to the first linkage member 60 at one end at a third pivot axis 66 and at an opposite end to the eccentric portion 46. The second shaft 16 and the eccentric portion 46 are rotatable relative to the second linkage member 64 about the second axis of rotation 44 so that the eccentric portion axis 48 serves as a pivot axis of the second linkage member 64.

The first linkage 60 and the second linkage 64 together establish the four-jointed linkage assembly 12 that controls movement of the connecting rod 56 and thus the stroke length of the piston 19 during the four-stroke working cycle. Movement of the connecting rod 56 is also affected by the relative angular orientation of the crankshaft 18 and the second shaft 16 established by the phasing mechanism 14. The four joints of the four-jointed linkage assembly are at the pivot axes 62 and 66, the crankpin axis 42, and the eccentric portion axis 48. Stated differently, the connection of the connecting rod 56 to the first linkage member 60 is a first joint, the connection of the second linkage member 64 to the first linkage member 60 is a second joint, the connection of the crankpin 42 to the first linkage member 60 is a third joint, and the connection of the eccentric lobe 46 to the second axis of rotation 64 is a fourth joint.

Figure 14:
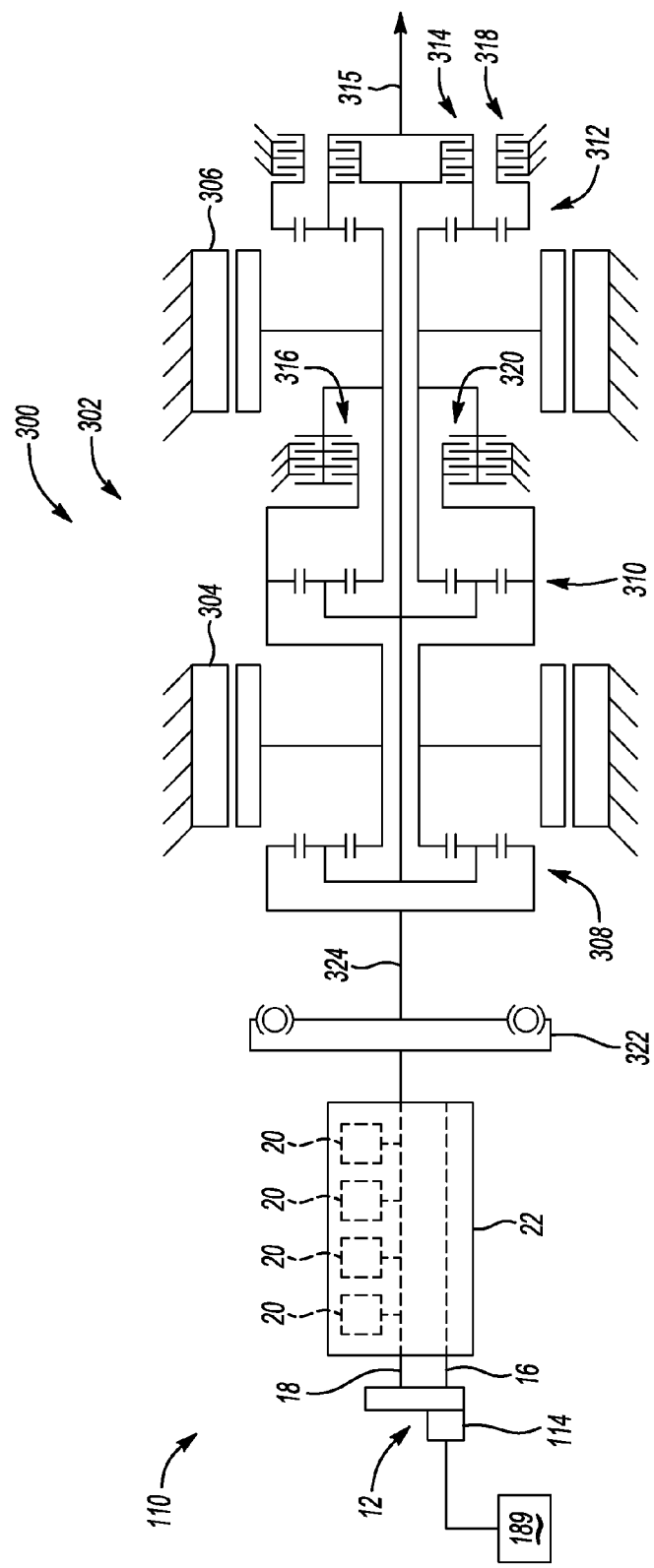
FIG. 14 is a schematic illustration of a hybrid powertrain having a second embodiment of an engine assembly identical to that of FIG. 1 but with an electric phaser used in place of a mechanical phaser.

As schematically represented in FIG. 14, the crankshaft 18 and the second shaft 16 are rotatably supported by the engine block 22 by bearings. The respective axes of rotation 38, 44 therefore do not translate. The crankshaft 18 rotatably drives the second shaft 16 through a drive system 70 shown in FIGS. 1 and 2. In the first embodiment of the engine assembly 10, the drive system 70 includes a first pulley 72 connected with the crankshaft 18 and rotatable therewith about the first axis of rotation 38. The first pulley 72 has teeth 74 that mesh with teeth 76 of a second pulley 78. The second pulley 78 can be rotatably supported by the engine block 22 at bearings. A third pulley 80 is connected with the second shaft 16 and rotatable therewith about the second axis of rotation 44. A belt 82 is engaged with the second pulley 78 and the third pulley 80. The belt 82 engages with teeth 84 on the third pulley 80. The second shaft 16 is thus driven by the crankshaft 18 through the drive system 70. The pulleys 72, 78, and 80 are sized so that the second shaft 16 rotates in an opposite direction of rotation as the crankshaft 18 at half the rotational speed.

Other embodiments of drive systems can be used to drive the second shaft 16. For example, FIGS. 5-12 schematically show another embodiment of an engine assembly 110 functionally identical to the engine assembly 10. The engine assembly 110 has a drive system 170 that consists of a first gear 172 mounted to rotate with the crankshaft 18 about the first axis of rotation 38, and a second gear 180 mounted to rotate with the second shaft 16 about the second axis of rotation 44. The second gear 180 is twice the diameter of the first gear 172, so that the second shaft 16 will rotate at half the rotational speed of the crankshaft 18. Each of the gears 172, 180 has teeth that are not shown for purposes of clarity in the drawings. The crankshaft 18, the second shaft 16, and the phasing mechanism 114 are shown in FIG. 5 but not in FIGS. 6-12.

Referring again to FIG. 1, the phasing mechanism 14 of the engine assembly 10 is a mechanical phaser and, more specifically, is a hydraulic vane phaser. The phasing mechanism 14 has a rotor 85 connected to rotate about the second axis of rotation 44 with the second shaft 16. The phasing mechanism 14 also has a stator 86 that is connected to rotate with the third pulley 80. Vanes 87 extend radially outward on the rotor 85. Cavities 88 are formed between the vanes 87 and the stator 86. An electronic controller 89 controls a valve mechanism 90 to add or release hydraulic fluid in cavities 88 on either side of the vanes 87, thereby changing the relative angular orientation of the rotor 85 relative to the stator 86. By changing the relative angular orientation of the rotor 85 relative to the stator 86, the angular orientation of the second shaft 16 is changed relative to that of the first shaft 18. Due to the four jointed linkage assembly 12, the stroke length of the compression stroke of the piston 19 changes, thereby establishing a different four-stroke working cycle. The modification of the stroke length is described more specifically with respect to the engine assembly 110 of FIGS. 5-12.

The engine assembly 110 utilizes an electric phaser 114 instead of a mechanical phaser. The electric phaser 114 is controlled to adjust the angular orientation of the second shaft 16 by a controller 189 in the same manner as controller 89 adjusts the angular orientation of the second shaft 16. The electric phaser 114 can include an electric motor, such as a DC motor and an electric power supply powering the motor. Although the engine assembly 10 of FIGS. 1-3 has a pulley and belt drive system 70 and a hydraulic phaser 14, the pulley and belt drive system 70 could be used with an electric phaser 114 like that of FIG. 5, or the meshing gear drive system 170 of FIGS. 5-12 could be used with a mechanical phaser like phaser 14.

Referring again to FIG. 3, the piston 19 is pivotably connected to the connecting rod 56 at the fourth pivot axis 58. The engine block 22 is configured so that a center axis C of the cylinder 20 is at an angle A relative to a vertical line L. In this embodiment, angle A is 25 degrees. With this orientation of the cylinder 20, the pivot axis 58 is aligned with the first axis of rotation 38 along the center axis C at all positions of the piston 19, because the piston 19 is constrained by the engine block 22 to move linearly in the engine block 22, and the axis of rotation 38 is fixed by the mounting of the crankshaft 18. That is, the crankshaft 18 can rotate but is otherwise fixed relative of the engine block 22.

A phase angle D can be defined when the crankpin axis 42 is positioned directly vertically above the first axis of rotation 38, as shown in FIGS. 5 and 9, with the phase angle D being indicative of the phasing of the second shaft 16 relative to the crankshaft 18. The phase angle D is defined between a first line E that extends through the crankpin axis 42 and the first axis of rotation 38 and a second line F that extends through the eccentric portion axis 48 and the second axis of rotation 44. The first line E is a vertical line, as the crankpin axis 42 is directly vertically above the first axis of rotation 38. In FIG. 5, the phase angle D is 18 degrees. The phasing mechanism 14 or 114 and the four jointed linkage assembly 12 allows the phase angle D to be varied between 18 degrees, shown in FIG. 5, and −40 degrees (i.e., 320 degrees), as shown in FIG. 9. When the phase angle D is 18 degrees, the piston 19 moves according to an Atkinson four-stroke working cycle shown in FIG. 5 at the top dead center position 50 at the end of an exhaust stroke, in FIG. 6 at a bottom dead center position 54 at the end of an expansion stroke, in FIG. 7 at the top dead center position 50 at the end of a compression stroke, and in the bottom dead center position 52 at the end of the intake stroke, with the bottom dead center position 52 being higher than the bottom dead center position 54. That is, the piston 19 is lower at the end of the expansion stroke than at the end of the intake stroke, consistent with an Atkinson cycle. The piston 19 moves according to the four-stroke cycle in order from the position in FIG. 8 (bottom dead center 52, end of the intake stroke), to the position in FIG. 7 (top dead center 50, end of the compression stroke), to the position in FIG. 6 (lower bottom dead center 54, end of the expansion stroke), to the position in FIG. 5 (top dead center 50, end of the exhaust stroke).

If the phasing mechanism 14 (or the phasing mechanism 114 in FIGS. 5-12) is controlled to change the phasing of the second shaft 16 relative to the crankshaft 18 so that the phase angle is −40 degrees (with a total change in phase angle of 58 degrees), as in FIG. 9, the piston 19 will achieve a bottom dead center position 59 at the end of the expansion stroke (see FIG. 12) that is lower than the bottom dead center position 52 of the expansion stroke of the Atkinson cycle. This results in a longer compression stroke in the Otto cycle compared to the Atkinson cycle. The piston 19 has a top dead center position 57 at the end of the compression stroke shown in FIG. 11 that is lowered approximately 0.8 mm in comparison to the top dead center position 50 at the end of the compression stroke of the Atkinson cycle so that the geometric compression ratio CR will increase by only 0.29 from 11.0 to 11.29 when phasing from the Atkinson cycle to the Otto cycle with a compression stroke length of 68.4 in the Atkinson cycle and a compression stroke length of 78.5 in the Otto cycle. This establishes an expansion ratio of 1.0 over the four-stroke working cycle of FIGS. 9-12, consistent with an Otto working cycle. This assumes a cylinder bore of 74 mm and a clearance volume of 28398 cubic millimeters. The piston 19 moves according to the four-stroke cycle in order from the position in FIG. 12 (bottom dead center 59, end of the intake stroke), to the position in FIG. 11 (top dead center 57, end of the compression stroke), to the position in FIG. 10 (bottom dead center 55, end of the expansion stroke), to the position in FIG. 9 (top dead center 51, end of the exhaust stroke).

The lower top dead center position at the end of the compression stroke of the Otto cycle relative to the Atkinson cycle ensures that the geometric compression ratio increases by only 0.29 rather than by 1.5 as would occur if the top dead center position of the piston 19 at the end of the compression stroke remained the same as in the Atkinson cycle. An increased geometric compression ratio can cause increased engine knock. The ultimate determinant of knock is the effective compression ratio, which is a function of geometric compression ratio and intake valve closing timing. If a phaser is added to a camshaft of the engine assembly 10 or 110, the effective compression ratio during the Otto cycle could be fined tuned by controlling the intake valves to operate according to a late intake valve closing timing schedule. However, because the design of the engine assembly 10, 110 enables the geometric compression ratio to be relatively constant in the Atkinson cycle and the Otto cycle, less reliance on late intake valve closing in the Otto cycle is required, enabling greater volumetric efficiency and power.

Figure 4:
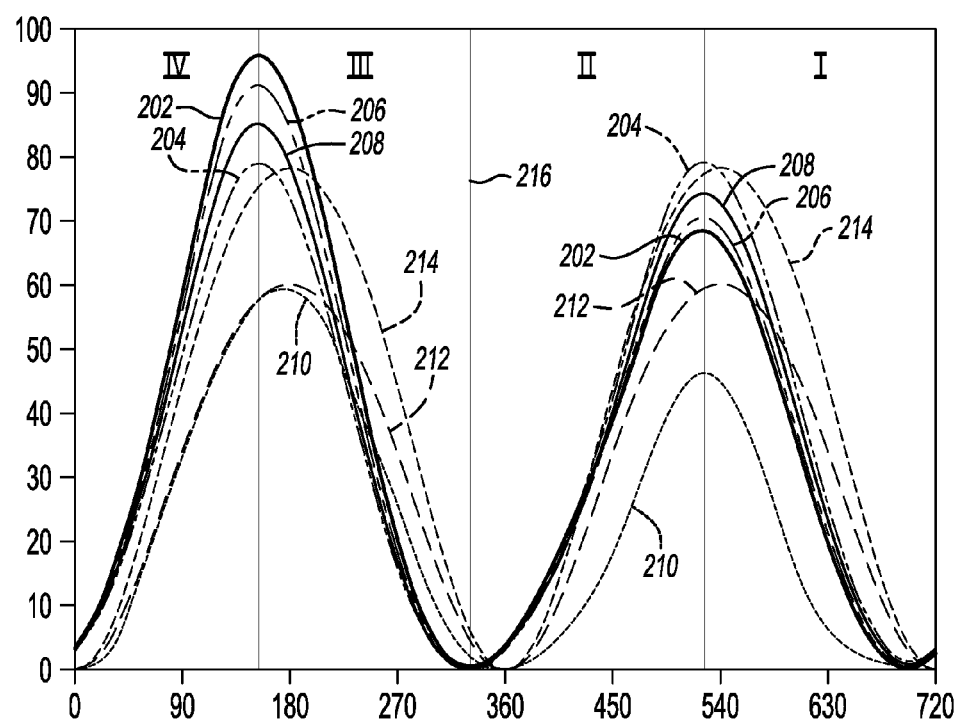
FIG. 4 is a schematic plot of piston displacement versus crank angle for motion of a piston using various multi jointed linkage assemblies, including the piston and crankshaft of FIG. 1, at various phase angles and stroke lengths.

FIG. 4 is a plot of piston displacement versus crank angle (i.e., angular position of the crankshaft) for motion of a piston over a four-stroke working cycle of various multi-linkage assemblies at various phase angles and stroke lengths. A four-stroke cycle in the order of intake stroke (section I), compression stroke (section II), expansion stroke (section III), and exhaust stroke (section IV) is represented from right to left in the plot. Curve 202 represents the displacement of the piston 19 of FIGS. 1-3 with a phase angle D of 18 degrees operating according to the Atkinson cycle of FIGS. 5-8 for best efficiency. Curve 204, illustrated with a long dash and two short dashes, represents the displacement of the piston 19 of FIGS. 1-3 with a phase angle D of 320 degrees (−40 degrees) operating according to the Otto cycle of FIGS. 9-12 for best power. Curve 206, illustrated with a longer dash and two shorter dashes, represents the displacement of the piston 19 with a phase angle D of 0 degrees. Curve 208 represents the displacement of the piston 19 with a phase angle D of 340 degrees. For each of curves 202, 204, 206 and 208, the cylinder 20 is arranged so that the center axis C of the cylinder 20 is 25 degrees from vertical, allowing the pivot axis 58 and the first axis of rotation 38 to be aligned along the center axis C, as discussed above.

Curve 210 represents the displacement of a piston in an engine assembly with a four jointed linkage assembly similar to that of engine assembly 10 or 110 but without the capability of phasing of the second shaft 16 relative to the crankshaft 18 and with the cylinder 20 arranged so that the center axis C is vertical. If the second shaft of this engine assembly was able to be phased relative to the crankshaft, the top dead center of the piston at the end of the compression stroke in the Otto cycle relative to the top dead center of the piston at the end of the compression stroke in the Atkinson cycle would change drastically, resulting in a change in compression ratio CR of 8 millimeters lower in the Otto cycle.

The curves 212 and 214 represent the displacement of a piston on an engine with a conventional crankshaft layout (i.e., without the four-jointed linkage assembly), when operated according to an Otto cycle with a compression stroke length of 60 mm and of 78 mm, respectively. A comparison of curves 204 and 214 indicates that the engine assembly 10, 110 operated according to the pseudo-Otto cycle (i.e., operated according to an Otto cycle with an expansion ratio of one, but with both bottom dead center positions and top dead center positions varied in the four-stroke cycle), achieves an expansion ratio of one, just as an engine assembly with the same compression stroke length operated according to a true Otto cycle.

Figure 13:
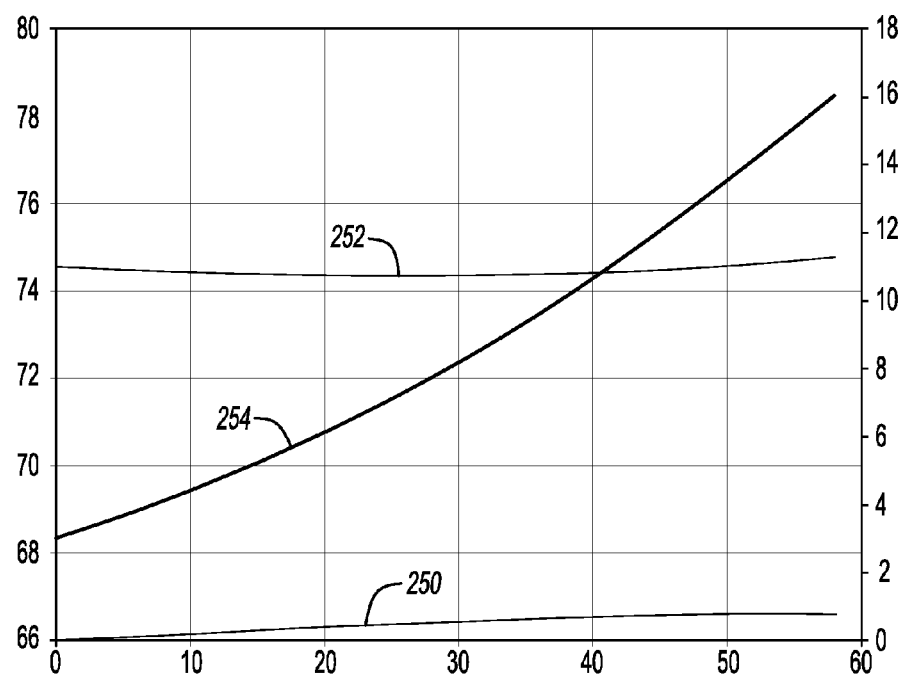
FIG. 13 is a plot illustrating compression stroke length in millimeters on the left vertical axis, piston top dead center position and compression ratio on the right vertical axis, versus phase angle of the second shaft.

FIG. 13 illustrates the effect of the lowered top dead center position of the compression stroke of the Otto cycle relative to the Atkinson cycle achieved by the engine assembly 10 and 110 with a cylinder bore of 74 millimeters, a compression stroke of 68.4 millimeters in the Atkinson cycle and 78.5 millimeters in the Otto cycle. The top dead center position 57 of FIG. 11 is lower by 0.79 millimeters than the top dead center position 50 of FIG. 7. This provides a squish volume (i.e., combustion chamber volume) of 0 in the Atkinson cycle and 3402 cubic millimeters in the Otto cycle, a displaced volume of 293,978 cubic millimeters in the Atkinson cycle and 337476 cubic millimeters in the Otto cycle, and a clearance volume of 29,398 cubic millimeters in the Atkinson cycle and 32800 millimeters in the Otto cycle.

Curve 250 shows the top dead center position relative to the cylinder bore in the engine block 22 with movement downward in the cylinder 20 represented as positive on the right vertical axis. The horizontal axis represents the angular orientation of the second shaft 16 relative to the crankshaft 18 over the 58 phasing range, from 0 degrees (corresponding with a phase angle D of 18 degrees in the Atkinson cycle) to 58 degrees (corresponding with a phase angle D of −40 degrees in the Otto cycle). Curve 252 represents the geometric compression ratio CR of the engine assembly 10 and 110 on the right vertical axis. The geometric compression ratio CR remains relatively constant. When the relative phase is 0 degrees (phase angle D of 18 degrees in the Atkinson cycle), the CR is 11.0. When the relative phase is 58 degrees (phase angle −40 degrees in the Otto cycle), the CR is 11.29. If the top dead center position of the Otto cycle did not lower by 0.791 as described when operating according to the Otto cycle relative to the Atkinson cycle, then the compression ratio during the Otto cycle would be 12.48. Such a relatively large jump in compression ratio would increase engine knock issues. The arrangement of the cylinder 20 so that the center axis C of the cylinder 20 is 25 degrees from vertical (i.e., angle A is 25 degrees), allows the pivot axis 58 and the first axis of rotation 38 to be aligned along the center axis C, causing the lowering of the top dead center position of the compression stroke of the Otto cycle relative to the Atkinson cycle to enable the relatively small change in geometric compression ratio CR as the engine assembly 10 or 110 is phased to the Otto cycle. Without this arrangement, for example, if the angle A was 0 degrees, the much larger variation in compression ratio CR would occur. Curve 254 shows the compression stroke length (left vertical axis) in millimeters.

In one embodiment shown in FIG. 14, the engine assembly 110 is part of a hybrid powertrain 300 that includes a hybrid transmission 302 having two motor/generators 304, 306 and three planetary gear sets 308, 310, 312. Two clutches 314 and 316 and two brakes, 318 and 320 can be selectively engaged, and the motor/generators 304, 306 and the engine assembly 110 can be controlled to establish different operating modes to provide torque at an output member 315. Those skilled in the art will understand how engine-only, electric-only, and hybrid operating modes in which both the engine assembly 110 and one or both motor/generators 304, 306 provide torque at the output member 315. A damping mechanism 322 is shown between the crankshaft 18 and a transmission input member 324.

The phasing mechanism 114 of the engine assembly 110 can be controlled by the controller 189 to operate the engine assembly 110 according to engine operating conditions, such as torque commanded at the output member 315. For example, an Otto Cycle can be achieved when high output torque is commanded at the output member 315, and the engine assembly 110 can be operated according to the Atkinson cycle when greater efficiency is desired. The engine assembly 10 can also be used with a hybrid transmission like transmission 302, and can be controlled in a like manner to switch between an Otto cycle and an Atkinson cycle by controlling the phaser 14.

The phasing of the second shaft 16 relative to the crankshaft 18 can also be controlled in response to other engine operating conditions, such as engine operating conditions indicative of at least one of a cold start, a warm start, and altitude greater than a predetermined altitude. The electric phaser 114 enables full flexibility of the phase angle D during engine starts. In other words, different positions of the phase angle D, and therefore different engine expansion ratios, can be established by the controller for different engine start conditions (cold-start, warm-start, and start at altitude). As used herein, a "cold start" is a start of the engine assembly 10 or 110 when fuel has been previously cut off and the vehicle has been stopped for at least a predetermined period of time. A "warm start" is a start of the engine assembly 10 or 110 after fuel has been cut off but while the vehicle is running, or if the engine 10 or 110 has been off only for less than a predetermined amount of time, so that the engine block 22 is above a predetermined temperature. For example, a warm start can be a start after the engine assembly 10 or 110 has been temporarily stopped while the vehicle waits at a stop light. A warm start can occur on a hybrid powertrain when changing from an electric-only operating mode (in which only one or more motor/generators power the vehicle) to a hybrid operating mode (in which both the engine assembly and one or more motor/generators power the vehicle). A "start at altitude" is a start of the engine assembly 10 or 110 when the vehicle is located above a predetermined altitude, such as but not limited to 1600 meters above sea level.

The electronic controller 189 can be configured to place the phasing mechanism 114 in a position during vehicle off (i.e. a phaser park position) to establish a phase angle D, giving a relatively low expansion ratio, such as an Otto cycle to give a longer compression stroke and a shorter expansion stroke. A longer compression stroke gives higher in-cylinder temperatures to promote fuel evaporation and combustion, and a shorter expansion stroke promotes higher exhaust temperatures to promote catalyst heating. For a warm start, the phaser park position could be established by the controller 189 to give a higher expansion ratio, giving a shorter compression stroke and lowering the effective compression ratio. This helps to reduce engine vibration during engine starts due to lower in-cylinder pressure oscillations, and prevent vibrations at the motor/generators 204, 206 that can disrupt motor torque.

The electric phaser 114 can also be controlled by the controller 189 in response to high altitude as an engine operating condition. The phaser park position (i.e., the angle D established when the engine is started at a high altitude) can be chosen to provide a lower expansion ratio (less Atkinson) during high altitude starts, giving higher in-cylinder pressures and temperatures to promote fuel evaporation and combustion. The expansion ratio flexibility of the engine assembly 110 could thus be exploited to optimize engine starting under different operating conditions with an electric phaser 114.

If the phasing mechanism is a mechanical phaser such as the hydraulic vane phaser 14, the phaser 14 has to be parked in the same phase angle D position during every engine start (whether a warm start, a cold start, or a start above a predetermined altitude) by design because no fluid pressure is available to retain the position of the vanes 87 relative to the stator 86. A park position of the rotor 85 must therefore be established by a park pin such as a park pin 92 extending from the rotor 85, shown in hidden lines in FIG. 1. The park pin 92 engages to lock the angular position of the rotor 85 when engine oil pressure is absent. That is, engine oil pressure keeps the pin 92 from engaging, but when oil pressure is absent, a biasing member, such as a spring, biases the pin 92 into a recess in the stator 86 to lock the stator 86 to the rotor 85, establishing a single engine-off locked rotational position of the second shaft 16. If a single-park position hydraulic phaser similar to phasing mechanism 14 is used, the single park position is selected that best satisfies the different optimal positions for a cold-start, warm-start, and a start above a predetermined altitude as described above.

While the best modes for carrying out the many aspects of the present teachings have been described in detail, those familiar with the art to which these teachings relate will recognize various alternative aspects for practicing the present teachings that are within the scope of the appended claims.

The invention claimed is:
1. An engine assembly comprising:
   an engine block defining a cylinder;
   a crankshaft having a first axis of rotation and a crankpin offset from the first axis of rotation;
   a second shaft offset from the crankshaft and having a second axis of rotation and an eccentric portion offset from the second axis of rotation;
   a piston operatively connected to the crankshaft and movable in the cylinder to drive the crankshaft; wherein the piston is pivotably connected to the connecting rod to pivot at a pivot axis; and wherein the cylinder is configured so that the pivot axis is aligned with the first axis of rotation along a center axis of the cylinder;
   a connecting rod extending from the piston;
   a four jointed linkage assembly pivotably connected to the connecting rod, the crankpin, and the eccentric portion;
   a drive system operatively connecting the crankshaft and the second shaft to drive the second shaft via the crankshaft; and
   a phasing mechanism operatively connected to the second shaft and controllable to vary the rotational position of the second shaft relative to the crankshaft to thereby vary the operation of the piston within the cylinder between an Otto cycle and an Atkinson cycle.

2. The engine assembly of claim 1, wherein the center axis of the cylinder is approximately 25 degrees from vertical.

3. The engine assembly of claim 1, wherein the Otto cycle and the Atkinson cycle each have an intake stroke, a compression stroke, a combustion stroke, and an exhaust stroke; and
wherein the top dead center position of the piston is lower in the compression stroke of the Otto cycle than in the compression stroke of the Atkinson cycle.

4. The engine assembly of claim 3, wherein the top dead center position of the piston in the compression stroke of the Otto cycle is less than one millimeter lower than in the Atkinson cycle.

5. The engine assembly of claim 1, wherein the crankpin has a crankpin axis substantially parallel to the first axis of rotation and the eccentric portion has an eccentric portion axis substantially parallel to the second axis of rotation;
wherein a phase angle is defined between a first line that extends through the crankpin axis and the first axis of rotation and a second line that extends through the eccentric portion axis and the second axis of rotation; wherein the phase angle is defined when the crankpin axis is positioned directly vertically above the first axis of rotation; and
wherein the phasing mechanism is operable to vary the phase angle by 58 degrees.

6. The engine assembly of claim 1, wherein the phasing mechanism is a hydraulic vane phaser.

7. The engine assembly of claim 1, wherein the drive system includes:
a first pulley connected with the crankshaft and rotatable therewith about the first axis of rotation;
a second pulley driven by the first pulley;
a third pulley connected with the second shaft and rotatable therewith about the second axis of rotation; and
a belt engaged with the second pulley and the third pulley so that the second shaft rotates at half speed relative to the first shaft.

8. The engine assembly of claim 1, wherein the drive system includes a first gear connected to rotate with the crankshaft about the first axis of rotation and a second gear meshing with the first gear and connected to rotate with the second shaft about the second axis of rotation so that the second shaft rotates at half speed relative to the first shaft.

9. The engine assembly of claim 1, wherein the phasing mechanism is an electric phaser and further comprising:
an electronic controller operatively connected with the electric phaser and configured to control the electric phaser to vary the rotational position of the second shaft relative to the crankshaft; and
wherein the controller varies the rotational position of the second shaft based on engine operating conditions indicative of at least one of a cold start, a warm start, and altitude greater than a predetermined altitude.

10. The engine assembly of claim 1, wherein the phasing mechanism is a mechanical phaser having a rotor connected to rotate about the second axis of rotation with the second shaft, a stator connected with the drive system, and a park pin configured to lock the stator to the rotor thereby establishing a single engine-off locked rotational position of the second shaft relative to the crankshaft.

11. An engine assembly comprising:
an engine block defining a cylinder;
a crankshaft having a first axis of rotation and having a crankpin with a crankpin axis offset from and substantially parallel to the first axis of rotation;
a piston operatively connected to the crankshaft and movable linearly in the cylinder to rotatably drive the crankshaft about the first axis of rotation according to a first four-stroke cycle having an intake stroke, a compression stroke, an expansion stroke, and an exhaust stroke;
a connecting rod extending from the piston;
a first linkage pivotably connected to the connecting rod to define a first pivot axis; wherein the crankpin is connected to the first linkage to define a second pivot axis aligned with the crankpin axis such that the first linkage moves with the crankpin about the first axis of rotation;
a second shaft offset from the crankshaft and having a second axis of rotation; wherein the second shaft has an eccentric portion with an eccentric portion axis offset from and substantially parallel to the second axis of rotation;
a second linkage pivotably connected to the first linkage to define a third pivot axis; wherein the eccentric portion is connected to the second linkage such that the second linkage moves with the eccentric portion about the second axis of rotation and moves the first linkage at the third pivot axis; wherein the cylinder has a center axis; wherein the piston is pivotably connected to the connecting rod to define a fourth pivot axis; wherein the cylinder is configured so that the fourth pivot axis is aligned with the first axis of rotation along the center axis of the cylinder;
a drive system operatively connecting the crankshaft and the second shaft to rotatably drive the second shaft about the second axis of rotation via rotation of the crankshaft about the first axis of rotation;
a phasing mechanism operatively connected to the second shaft and controllable to vary the rotational position of the second shaft relative to the crankshaft to switch from the first four-stroke cycle to a second four-stroke cycle, each four-stroke cycle having an intake stroke, a compression stroke, an expansion stroke, and an exhaust stroke; and
wherein a ratio of a length of the expansion stroke to a length of the compression stroke is greater than one in the first cycle and is one in the second cycle, and the top dead center position of the piston is lower in the compression stroke of the second cycle than in the compression stroke of the first cycle.

12. The engine assembly of claim 11, wherein the center axis of the cylinder is approximately 25 degrees from vertical.

13. The engine assembly of claim 11, wherein the wherein the top dead center position of the piston in the compression stroke of the second cycle is less than one millimeter lower than in the first cycle.

14. The engine assembly of claim 11, wherein a phase angle is defined between a first line that extends through the crankpin axis and the first axis of rotation and a second line that extends through the eccentric portion axis and the second axis of rotation; wherein the phase angle is defined when the crankpin axis is positioned directly vertically above the first axis of rotation; and
wherein the phasing mechanism is operable to vary the phase angle over a range of −40 degrees to 18 degrees.

15. The engine assembly of claim 11, wherein the phasing mechanism is a hydraulic vane phaser.

16. The engine assembly of claim 11, wherein the drive system includes:
a first pulley connected with the crankshaft and rotatable therewith about the first axis of rotation;
a second pulley driven by the first pulley;
a third pulley connected with the second shaft and rotatable therewith about the second axis of rotation; and a belt engaged with the second pulley and the third pulley so that the second shaft rotates at half speed relative to the first shaft.

17. The engine assembly of claim 11, wherein the drive system includes a first gear connected to rotate with the crankshaft about the first axis of rotation and a second gear meshing with the first gear and connected to rotate with the second shaft about the second axis of rotation so that the second shaft rotates at half speed relative to the first shaft.

18. The engine assembly of claim 11, wherein the phasing mechanism is an electric phaser and further comprising:
an electronic controller operatively connected with the electric phaser and configured to control the electric phaser to vary the rotational position of the second shaft relative to the crankshaft; and
wherein the controller varies the rotational position of the second shaft based on engine operating conditions indicative of at least one of a cold start, a warm start, and altitude greater than a predetermined altitude.

19. The engine assembly of claim 11, wherein the phasing mechanism is a mechanical phaser having a rotor connected to rotate about the second axis of rotation with the second shaft, a stator connected with the drive system, and a park pin configured to lock the stator to the rotor thereby establishing a single engine-off locked rotational position of the second shaft relative to the crankshaft.

* * * * *